Figure 1:
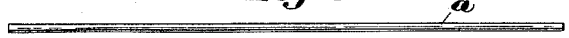

(No Model)

A. B. DODGE.
KNITTING MACHINE NEEDLE AND METHOD OF MAKING.

No. 584,542.  Patented June 15, 1897.

Witnesses:
Walter E. Lombard
Thomas J. Drummond

Inventor:
Avery B. Dodge,
by Crosby & Gregory,
Attys.

UNITED STATES PATENT OFFICE.

AVERY B. DODGE, OF MANCHESTER, NEW HAMPSHIRE.

KNITTING-MACHINE NEEDLE AND METHOD OF MAKING.

SPECIFICATION forming part of Letters Patent No. 584,542, dated June 15, 1897.

Application filed November 18, 1895. Serial No. 569,281. (No model.)

*To all whom it may concern:*

Be it known that I, AVERY B. DODGE, of Manchester, county of Hillsborough, State of New Hampshire, have invented an Improvement in Knitting-Machine Needles and Methods of Making, of which the following description, in connection with the accompanying drawings, is a specification, like letters on the drawings representing like parts.

Knitting-machine needles are usually made from blanks cut from round wire of suitable length bent at a point between the ends to form the nib or projection to be engaged by the needle-cam and tempered and finished to leave the opposite sides of the needle and nib flat, that the needles may run in the usual needle-guides or grooves. The bend forming the nib must, for the best results, be prevented from separating, and this has heretofore been accomplished in various ways, one of which is by soldering the sides of the nib together. Such mode of securing the joint is objectionable because the solder is easily broken, spoiling the needle, and a final cleaning process is necessary to prevent rusting. Brazing the joint, if done before the needle is tempered, is objectionable, because the brazing material is liable to melt or soften during the tempering, sticking a number of needles together. If the brazing is done after tempering, the heating necessary to braze softens the needle in the vicinity of the joint, practically removing the temper and necessitating a finishing process to remove the borax or other flux and leave the nib of proper thickness or gage. If a small ring or band is placed around the nib, a particular needle-groove must be employed to accommodate the needle, increasing the cost of the machine and preventing the use of such needles on any but machines provided with such grooves.

I have overcome all of the foregoing objections by making use of a weld-joint to retain the sides of the nib from separating, thereby improving the needle, increasing its strength and durability, and decreasing its cost. The latch has heretofore been pivoted in place between the walls of the latch-slot in various ways, all having for their objects the retention of the latch in place between the walls while freely movable on its pivot and maintaining smooth the outer faces of the walls to prevent the yarn catching thereon. So far as I am aware, however, the various devices employed for this purpose have been more or less objectionable because after wear the ends of the rivet would protrude beyond the slot-walls or the latch would work out. I have discovered, however, that by welding the rivet may be effectually and firmly secured in place without interfering with free movement of the latch or making rough places on the exterior of the walls.

Figure 2:
Figure 3:
Figure 4:
Figure 5:
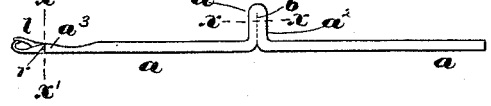
Figure 6:
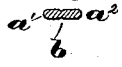
Figure 7:
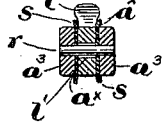

Figure 1 is a view of the wire-blank from which the needle is made. Fig. 2 represents the blank as bent between its ends to form the nib. Fig. 3 shows the sides of the nib as retained from separation by a weld. Fig. 4 shows the welded blank flattened preparatory to formation of the hook and latch. Fig. 5 represents the completed needle. Fig. 6 is an enlarged cross-section taken on the line $x\ x$, Fig. 5, through the flattened nib; and Fig. 7 is a greatly-enlarged transverse section on the line $x'\ x'$, Fig. 5, to show the manner of preparing the latch-rivet for welding.

The blank $a$, of round wire, suitable in length and diameter, is bent between its ends and upon itself at $a'\ a^2$, Fig. 2, to form the nib, projecting laterally from the body of the needle. The blank may then be welded, to retain the sides $a'$ and $a^2$ of the nib from separation, by a weld at $b$ previous to flattening, as the latter step will not destroy the weld, or it may in some instances be welded after the wire is fully flattened, as shown in Fig. 4, as the welding does not increase the thickness of the nib.

A needle made in accordance with my invention has all the strength and general appearance of a needle made from sheet-steel, to which the hook and small part of the needle are soldered, and the nib cannot separate or pull apart when in use.

I have not found it necessary to use borax or other flux in making the weld, but should it be found desirable to use a flux the tempering and finishing operations would remove it from the needle, leaving its surface perfectly clean.

Preferably I weld while the blank is round, as in Fig. 3, or just after it has been flattened, as shown in Fig. 4, as welding after finishing and tempering would draw the temper and necessitate additional smoothing or finishing to bring the nib to its proper condition.

In Fig. 6 it will be seen that the weld $b$ does not increase the thickness of the nib, as it is between the sides or bends $a'$ and $a^2$ thereof.

If pressure be applied to the sides of the nib at the time of welding, the metal can be squeezed up between the sides $a'$ and $a^2$, and the subsequent flattening in a drop-press or by other suitable means makes a substantially homogeneous flat-surface nib.

If the weld is made without pressure on the sides of the bend, the subsequent flattening of the needle-blank will leave a small groove or gutter in the nib.

Referring to Fig. 7, the rivet $r$ is extended through suitable holes drilled in the walls $a^3$ of the latch-slot $a^\times$, passing through a hole $l'$ in the latch $l$, the hole being enough larger than the rivet to insure freedom of movement of the latch. A thin non-metallic shield $s$ is interposed between each side of the latch and the inner adjacent face of the slot-wall, and then the temperature of the rivet and adjacent walls $a^3$ is raised to welding heat, pressure being applied to the rivet ends to spread it sufficiently to form a complete weld with the walls. The shields $s$ prevent contact of the latch and inner faces of the walls $a^3$ when the pressure is applied, so that the latch is not prevented from movement.

In the course of my experiments I have found that a hard calendered paper will answer for the shield, the heat subsequently carbonizing it, so that in the tumbling operation to finish the needles the carbon will be loosened or broken up and permitted to fall out. The rivet is thus made, practically, an integral part of the slot-walls and the latch turns freely upon the rivet within the slot.

Other non-metallic substances may be used instead of paper, and my invention is not limited, therefore, to any particular material.

My invention is not restricted to the precise shape of the nib or needle herein shown, nor to the precise construction herein shown, as modifications may be made without departing from the spirit and scope of my invention, the gist of which consists in securing or retaining the sides of the nib from separating by a weld-joint, and also in securing the latch-rivet solidly in the walls of the needle.

Having fully described my invention, what I claim, and desire to secure by Letters Patent, is—

1. A knitting-machine needle having its shank composed of wire folded or bent on itself in the formation of the nib, said folded or bent parts being welded together and made integral in the nib, substantially as described.

2. The herein-described process of making knitting-machine needles, which consists in bending or folding a blank of round wire upon itself to form the nib of the needle, welding together the contiguous sides of the wire in the nib, and then flattening the blank on opposite sides by pressure, substantially as described.

3. The herein-described process of making knitting-machine needles, which consists in bending or folding a blank of round wire upon itself, to form the nib of the needle, welding together the contiguous sides of the wire in the nib, and then flattening the blank on opposite sides by pressure, and thereafter tempering the blank, substantially as described.

In testimony whereof I have signed my name to this specification in the presence of two subscribing witnesses.

AVERY B. DODGE.

Witnesses:
JOHN H. RICE,
H. F. SMYTH.